No. 723,005. PATENTED MAR. 17, 1903.
R. MORRILL.
PISTON.
APPLICATION FILED FEB. 6, 1902.
NO MODEL.
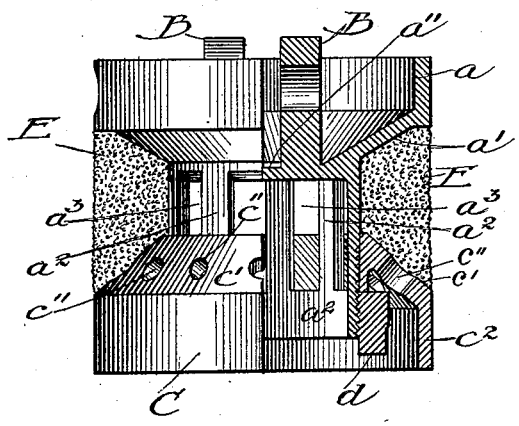
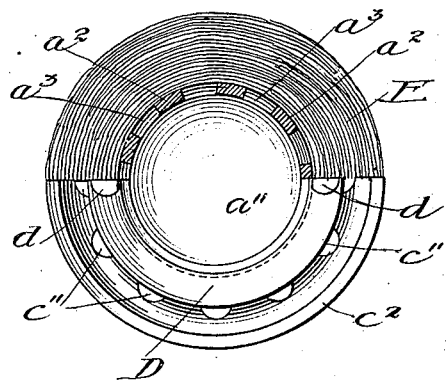
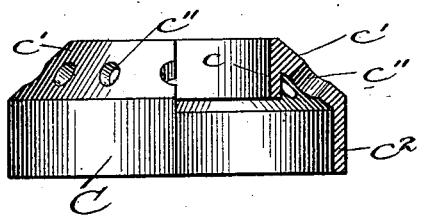
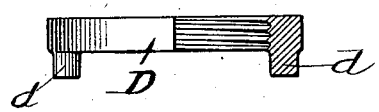
Witnesses:
Frank Blanchard
Bella Evans
Inventor:
Roland Morrill
By Hopkins
Attorney.

UNITED STATES PATENT OFFICE.

ROLAND MORRILL, OF BENTON HARBOR, MICHIGAN.

PISTON.

SPECIFICATION forming part of Letters Patent No. 723,005, dated March 17, 1903.

Application filed February 6, 1902. Serial No. 92,817. (No model.)

*To all whom it may concern:*

Be it known that I, ROLAND MORRILL, a citizen of the United States, residing at Benton Harbor, in the county of Berrien and State of Michigan, have invented certain new and useful Improvements in Pistons, of which the following is a specification.

The present invention relates to pistons generally and may be embodied in a piston to which power is applied and which in turn exerts its pressure upon a fluid, as in a pump or compressor, or it may be embodied in a piston upon which a fluid under pressure exerts its pressure and which in turn exerts its pressure upon some other part, as in an engine or other motor. I desire to have it understood, therefore, that the invention is not limited to the character of the machine in which the piston is used, but that, on the contrary, it is concerned only with the construction of the piston itself.

Both the construction and mode of operation of a cup-leather packing are well understood in the art. It is automatic in its operation to the extent that its pressure against the walls of the cylinder is proportional to the outward pressure of the fluid upon it, so that during the working stroke it is forced outward with greater or less force, while during the return stroke it is allowed to contract, thereby reducing the friction to a minimum.

The principal object of the present invention is to provide a piston and a packing therefor of such construction that while acting somewhat upon the above-described principle of the cup-leather packing it shall at the same time have the additional advantage of an inherent ability to automatically expand and contract in proportion to the pressure of the fluid upon it supplemented by means adapted to be operated manually for taking up excessive wear.

Another object of the invention is to provide a piston which is hollow to the extent that the fluid under pressure may enter it and which has lateral openings presented outward and covered by the packing, so that the fluid under pressure entering the cylinder and passing outward through said openings will act upon the packing to expand it in proportion to its own pressure.

Another object of the invention is to provide a piston with a body portion having a shoulder against which the packing reacts and a follower mounted loosely upon said body, so as to be capable of sliding thereon freely, the follower also being provided with a shoulder engaging the packing, so that the pressure of the fluid upon the follower causes the follower to react upon the packing and expand it in proportion to the pressure of the fluid upon the follower.

Other objects of the invention will appear hereinafter.

In the accompanying drawings, which are made a part of this specification, Figure 1 is a view, partly in side elevation and partly in central section, of a piston embodying the invention. Fig. 2 is a view thereof, partly in plan and partly in transverse section. Fig. 3 is a view of the follower, partly in side elevation and partly in central section. Fig. 4 is a view of the adjusting-ring, partly in side elevation and partly in central section.

What may be termed the "body" of the piston is represented by the letter A. It comprises a cylindrical portion $a$, that is adapted to fit the cylinder more or less closely, a tapering or frusto-conical shoulder $a'$, a diaphragm $a''$, and a shell $a^2$, which is tubular, save that it has through it a series of lateral openings $a^3$, which are preferably elongated in the direction of its length and extend, preferably, from the diaphragm $a''$ to within a short distance of the end of the shell $a^2$. This body portion of the piston may have a pair of perforated ears or lugs B, through the medium of which the piston-rod or other device for transmitting movement or power to or from the piston is attached. Mounted loosely upon this shell, so as to be capable of sliding thereon, is a follower C, comprising a short cylinder or ring $c$, a tapering or frusto-conical shoulder $c'$, provided with openings $c''$, and a cylindrical portion $c^2$, which fits the cylinder about as does the cylindrical portion $a$ of the body A.

The follower C is mounted upon the shell $a^2$ so that while it fits snugly it is nevertheless capable of moving freely thereon longitudinally in response to pressure upon it in the direction of the length of the cylinder or the movement of the piston.

The exterior of the shell $a^2$ is threaded, and onto it is turned a threaded ring D, provided with studs $d$ or other means for receiving a spanner or other tool, whereby the ring may be turned up to force the follower C toward the shoulder $a'$ of the shell for taking up or compensating for wear.

Between the tapering faces $a'$ and $c'$ of the body A and follower C is placed a mass E of packing material of some suitable sort. I do not limit myself to a packing material of any particular kind, but prefer to use loose wicking, as it is cheap and has been found to be absolutely effective in accomplishing the objects of the invention. As illustrated in the drawings it is wound around the shell $a^2$, so as to completely fill the space bounded by the two tapering shoulders $a'$ and $c'$, the shell $a^2$, and the inner surface of the cylinder. When so arranged, it is manifest that fluid under pressure on what may appropriately be termed the "working" side of the piston entering the hollow shell $a^2$ will pass outward through the openings $a^3$ and contact with the mass E of packing material. This material being elastic will be expanded outward laterally and will be forced into more or less intimate contact with the inner surface of the cylinder in which the piston fits, and its outward pressure will of necessity be proportional to the pressure of the fluid upon it, so that in this respect the action of the packing will be automatic—that is to say, it will have heavy or light frictional contact with the cylinder, accordingly as heavy or light frictional contact is required. When the piston is making its working stroke, the frictional contact of the packing will be proportional to the pressure of the fluid upon the piston, and when the piston is making its return stroke (the packing being entirely relieved of the pressure of the fluid) the packing will contract by its own elasticity and its friction with the cylinder will be reduced to a minimum.

The tapering or conical form of the shoulder $c'$ tends to give it a wedging action and increase the diameter of the packing as the follower C is forced onto the body of the piston, and it also has the advantage of reducing the lower margin of the body of packing to a thin lip or feather-edge, thus making it extremely sensitive to the action of the fluid which reaches it through the openings $c''$.

In the ordinary operation of the piston there will be more or less movement of the follower C relatively to the body A. As the piston is making its working stroke the pressure of the fluid will tend to move the follower toward the shoulder $a'$ of the body A, and this in turn will tend to expand the packing. When the piston is making its return stroke, the follower being wholly or substantially relieved of the pressure of the fluid upon it, the packing, following the laws of elasticity, will tend to contract and move out of contact with the walls of the cylinder, and these operations will be repeated at each and every stroke of the piston.

Having thus described my invention, the following is what I claim as new therein and desire to secure by Letters Patent:

1. A piston having a hollow part provided with openings presented outward and a body of elastic packing material surrounding said hollow part and covering said openings, substantially as described.

2. A piston having a hollow part provided with openings presented outward, a follower slidably mounted upon said hollow part and a body of elastic packing material surrounding the hollow part and covering said openings, the piston being provided with a shoulder against which the packing bears, substantially as described.

3. A piston having a hollow part provided with openings presented outward, a body of elastic packing material surrounding said hollow part and having an inclined, or tapering shoulder engaging said packing material, substantially as described.

4. A piston having a body portion, a body of elastic packing material surrounding said body portion, and a follower slidably mounted upon said body portion and having openings covered by the packing material, substantially as described.

5. A piston having a body portion, a body of elastic packing material surrounding it, and a follower slidably mounted upon the said body portion and having an inclined shoulder engaging the packing, said shoulder being provided with openings, substantially as described.

6. A piston having a hollow portion provided with openings presented outward, a body of elastic packing material surrounding said hollow portion and covering said openings, a follower slidably mounted upon said hollow portion and having a shoulder engaging the packing, and a threaded ring turned onto said hollow portion and engaging the follower for holding it in place, substantially as described.

7. A piston having a body portion comprising a cylindrical portion $a$, a tapering shoulder $a'$, the diaphragm $a''$ and a hollow shell $a^2$ provided with openings $a^3$, the follower C slidably mounted upon the hollow shell $a^2$ and having the tapering shoulder $c'$ provided with openings $c''$ and a cylindrical portion $c^2$, and a body of elastic packing material filling the space between the shoulders $a'$ and $c'$, substantially as described.

ROLAND MORRILL.

Witnesses:
L. M. HOPKINS,
BELLA EVANS.